United States Patent [19]
Harris et al.

[11] Patent Number: 5,684,684
[45] Date of Patent: Nov. 4, 1997

[54] DC OR CAPACITIVELY COUPLED BI-DIRECTIONAL SYNC

[75] Inventors: Philip M. Harris, San Diego; Robert M. Martinelli, Temecula, both of Calif.

[73] Assignee: Natel Engineering Company, Inc., Chatsworth, Calif.

[21] Appl. No.: 641,092

[22] Filed: Apr. 29, 1996

[51] Int. Cl.⁶ .............................. H02M 7/00; H02J 1/00
[52] U.S. Cl. .............................. 363/71; 363/72; 307/87
[58] Field of Search .............................. 363/65, 71, 72, 363/95; 307/87

[56] References Cited

U.S. PATENT DOCUMENTS

| | | | |
|---|---|---|---|
| 4,174,534 | 11/1979 | Kotlarewsky | 363/26 |
| 4,429,233 | 1/1984 | Kammiller | 307/87 |
| 4,598,352 | 7/1986 | Narvhus et al. | 363/69 |
| 4,734,844 | 3/1988 | Rhoads | 363/72 |
| 4,886,981 | 12/1989 | Lettini et al. | 363/72 |
| 5,142,217 | 8/1992 | Gontowski, Jr. | 363/71 |
| 5,345,231 | 9/1994 | Koo et al. | 340/870.31 |
| 5,451,858 | 9/1995 | Van Duyne et al. | 323/281 |

Primary Examiner—Peter S. Wong
Assistant Examiner—Bao Q. Vu
Attorney, Agent, or Firm—Gilliam, Duncan, Harms

[57] ABSTRACT

A controller for controlling the frequency of an oscillator associated with establishing the switching frequency of a PWM power supply. Each one of a plurality of PWM power supplies are connected through a common bus to a bi-directional connection on the controller. The controller has an internal comparator which compares its associated oscillator frequency with the frequency on the common bus. If the frequency of its associated oscillator is lower than the frequency on the bus then the controller increases its associated oscillator frequency to the the bus frequency. If the frequency on the bus is less than the frequency of its associated oscillator then the controller elevates the bus frequency to its associated oscillator frequency. In this manner, the power supply associated with the oscillator having the highest frequency establishes the master frequency and all other oscillators are slaves. The controller can be either capacitively or DC coupled to its associated oscillator.

11 Claims, 3 Drawing Sheets

DC OR CAPACITIVELY COUPLED BI-DIRECTIONAL SYNC

BACKGROUND OF THE INVENTION

1. Field of the Invention

This invention is in the field of power systems and devices utilizing the same, and more particularly to synchronization of switching frequencies of identical multiple switching power supplies.

2. Description of the Prior Art

Power supply synchronization (sync) is typically accomplished by a master clock which forces all power converters to synchronize to the master clock frequency. The master clock could be the internal oscillator of one of the power supplies to be synchronized, the highest operating frequency of any one of the power supply oscillators or a separate clock signal generated by a system clock.

U.S. Pat. No. 4,429,233 by inventor Neil A. Kammiller issued Jan. 31, 1984 teaches a synchronizing circuit for use in each high frequency power supply of a combination in which two or more identical such power supplies are connected in parallel across a load. The circuit allows the supplies to be synchronized in phase and frequency to each other. Synchronization is accomplished by having the circuit allow the power supply with the internal oscillator having the highest operating frequency to be designated as the master and provide the synchronizing signal to the other slower running power supplies oscillators in the parallel combination. The synchronization is accomplished by transformer coupling.

U.S. Pat. No. 5,142,217 by Inventor Walter S. Gontowski, Jr. issued Aug. 25, 1992 teaches synchronization of multiple PWM (pulse width modulated) power supplies wherein the first power supply internal oscillator to generate a pulse controls the frequency of the internal oscillators in the remaining associated power supplies.

U.S. Pat. No. 4,886,981 by inventor Lentini et al. teaches synchronizing units for multi-power supplies connected by means of first and second buses CSM and SM and a return bus. The the oscillator of the first synchronizing unit to receive an activation signal is designated the master oscillator and applies a clock signal to the SM bus to synchronize the oscillators of the remaining synchronizing units.

U.S. Pat. Nos. 4,174,534, 4,598,352, 4,734,844 an 5,451,858 teach various synchronizing schemes for multi-power supplies and the like.

All of the prior art multi-power supplies require a frequency controller having a separate first input and a second output connection for synchronization of the frequency of their associated PWM power supply.

The instant invention advances the PWM power supply synchronizing art by using a unique frequency controller having only a single bi-directional port connection for both input and output interconnections between like controllers associated with each one of a plurality of like power supplies for their synronization thereby reducing the amount of necessary circuits and components for the purpose of synchronizing multiple-power supplies of the type discussed.

SUMMARY OF THE INVENTION

A first embodiment of the invention is directed to a sync control circuit (controller) for each of a plurality of like PWM power supplies shown operating in parallel each of which includes an R-C Oscillator with a given operating frequency associated therewith for regulating the power supply operating frequency.

Each controller maintains the oscillator frequency of their associated power supply within a selected narrow range of frequencies. Each controller has only two outside connections a first bi-directional frequency input and output sync port and a second sync return port connector. The Sync port and return port of each controller are interconnected in parallel via a sync bus and the return ports are likewise interconnected in parallel via a sync return bus. The sync return port can be the same port as the power supply return port, thus eliminating a second connection.

The sync controller has two possible states. In a first state functioning as the master frequency controller, normally high and sync low. During the period of time that the oscillator capacitor, C2, is being charged, the bi-directional sync port is high. When the oscillator capacitor, C2, is discharged by the R-C oscillator circuit, the controller initiates a one shot cycle which pulls the sync port low for a pre-determined time period generating a master sync pulse.

The controller also has two possible states when functioning secondly as the slave controller, normally high and triggered low. That is, during the period of time that the oscillator capacitor, C2, is being charged, the bi-directional sync port is high and when the master controller generates the sync (low) pulse, the slave responds to the trigger by generating a positive going pulse at the bottom of C2 which causes the oscillator to discharge the capacitor and initiates a new cycle.

As a result, the whole group of oscillators will sync to the first oscillator to generate a sync (low) pulse, i.e. the group will synchronize to the highest frequency oscillator connected to the bus.

As different ones of the associated power supply oscillators change frequency slightly the one with the highest frequency will now become the master with the remaining oscillators becoming slaves. Changes of any of the oscillators from master to slave can occur at any time during operation of the power supplies via the bi-directional bus connecter.

In a second embodiment of the controller the controller is DC coupled to its associated oscillator and controls the frequency of a ring type oscillator rather than an R-C type as hereinbefore discussed. The resulting control of the frequency of the Ring oscillator is essentially the same as described above.

A principle object of this invention is to reduce the number of components needed to synchronize the frequency of the oscillators of a plurality of parallel connected PWM power supplies connected to a common load.

Another object of this invention is to provide synchronizing of a plurality of PWM power supplies without the need of a designated or separate master clock.

Yet another object of this invention is to provide synchronization of the frequency of a plurality of PWM power supplies using only a first signal bi-directional post connector and a second signal return post connector on each power supply controller.

Still another object of this invention is to provide multi-power supply synchronizing by utilizing the local oscillator of each of the multi-power supplies as either a master or slave depending on the frequency of an individual power supply oscillator.

Still another object of this invention is to provide synchronization to a plurality of parallel connected PWM power supplies using less components thereby reducing the economic expense of the synchronizing.

These and other objects of this invention will be apparent to those of ordinary skill in the art having reference to the following specifications together with the drawings.

DETAILED DESCRIPTION OF THE FIRST PREFERRED EMBODIMENT

Figure 1:
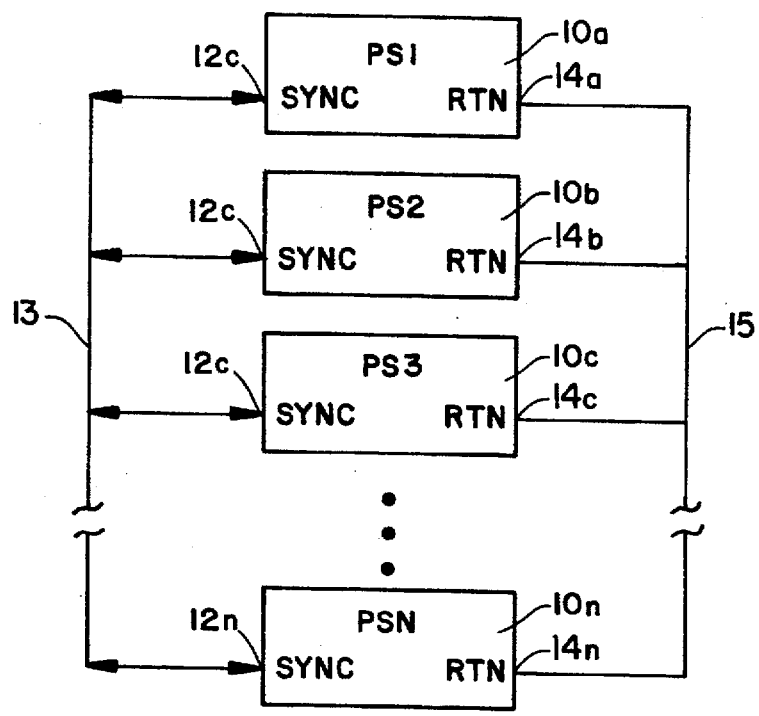
FIG. 1 is a block diagram of multiple-power supplies incorporating the present invention.

Referring now specifically to drawing FIG. 1, a plurality of like PWM power supplies 10–10N are shown. Each of the power supplies has a frequency signal bi-directional frequency sync connector or post 12–12N and a return connection or post 14–14N. Any number of like power supplies can be connected to the sync bus 13 and return bus 15.

Figure 2:
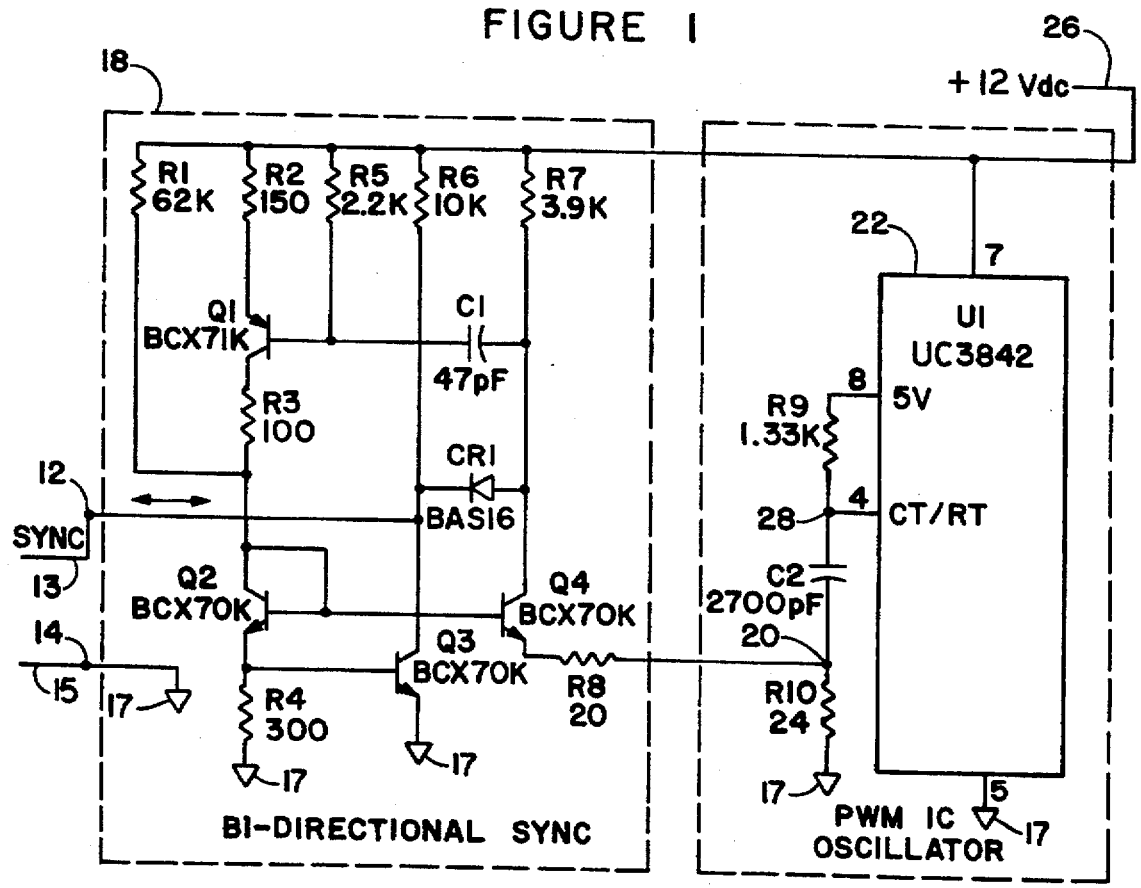
FIG. 2 is a schematic showing of the first embodiment of the invention with a power supply using an internal RC-oscillator.

FIG. 2 depicts a bi-directional power supply oscillator frequency controller circuit 18 connected via connection 20 to a capacitor C2 of an R-C type oscillator 22 of its associated PWM power supply 10.

The controller circuit 18 comprises resistors R1-R8, Q1-Q4, CR1 and C1 having values and interconnected as shown in drawing FIG. 2.

The R-C oscillator of the power supply includes an oscillator 22 of the IC type UC3842 or equivalent, R9, R10 and C2 having values and interconnected as shown in drawing FIG. 2.

The controller and oscillator circuits are interconnected at terminal 20. Both the controller and oscillator circuits are powered via +12 volt line 26. The distal ends of R4 and R10, the emitter of Q3 and terminal 5 of IC 22 are connected together and to return bus 17.

Referring now specifically to drawing FIG. 2, the oscillator functions by alternately charging C2 until the high threshold voltage, set by the internal circuitry of the UC3842 is reached, at which time C2 is discharged through R10 and the UC3842. C2 continues to discharge until the low threshold voltage, set by the internal circuit of UC3842 is reached. In a conventional RC oscillator, C2 is tied directly to ground (R10 is shorted).

Figure 3:
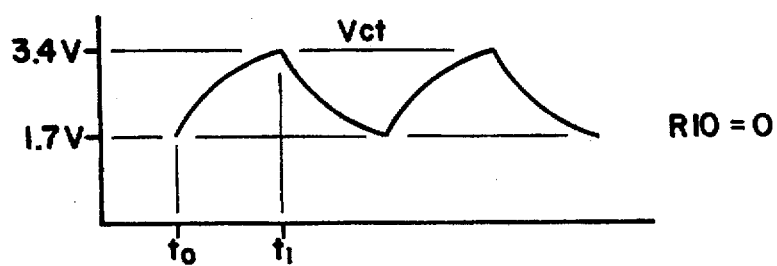
FIG. 3 is a showing of the internal oscillator wave form under certain first oscillator RC conditions.

FIG. 3 shows how the waveform looks on terminal 4 of UC3842 with R10 shorted.

Figure 4:
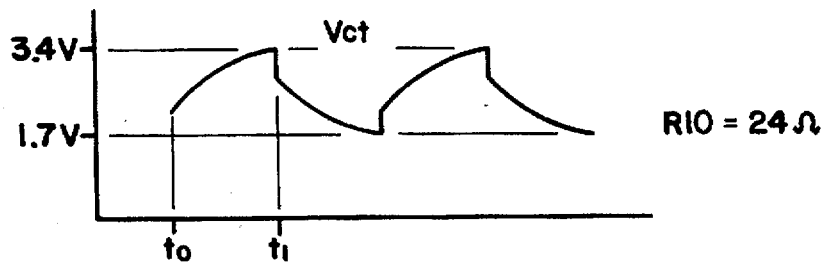
FIG. 4 is a showing of the oscillator wave form under certain second oscillator RC conditions absent the bi-directional sync circuit of the invention.

FIG. 4 shows how the waveform would look when R10 is 24 ohms with the controller circuit not present. Note the step voltage at t1. This step voltage is used to create the sync signal, by turning on Q4 (whose base is biased at 0.7V by Q2). Q4 turns on Q1 (through C1) which provides current to the base of Q4 through R3 (turning Q4 on hard). The oscillator "Sync" signal 12–12N, which was previously pulled high by R6 is pulled low by Q3, which was turned on by current from Q1 through R3 and Q2. While Q4 is on, current flows from it, through R8 and into C2 and R10. Q4 remains on until the voltage on C1 is charged by R5. Once Q4 is off the oscillator "Sync"signal returns to its normally high state. If the oscillator "Sync"signal is pulled low by another, higher frequency power supply's oscillator "Sync"signal, Q1 is turned on through CR1 and C1, which turns on Q4 putting current into C2 and R10. Voltage appearing on terminal 4 of the UC3842, caused by current from Q4, causes the high threshold of the RC oscillator 22 to be reached, causing the oscillator to synchronize with the incoming "Sync" signal from bus 13.

Figure 5:
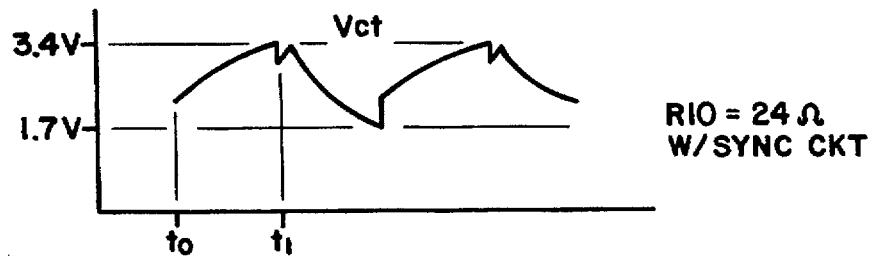
FIG. 5 is a master operation mode showing of the internal oscillator wave form (Vct)

FIG. 5 shows the waveform on pin 4 of the UC3842 with no incoming "Sync"signal on bus 13 or when it is the master.

Figure 6:
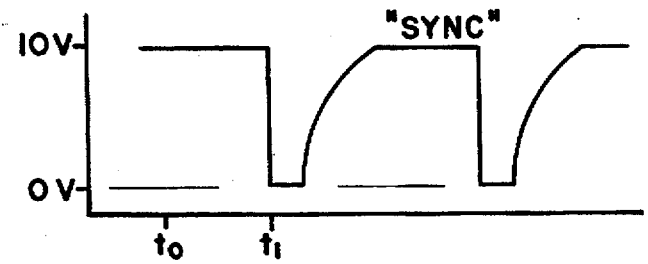
FIG. 6 depicts the sync port voltage wave form.

FIG. 6 shows the "sync"signal waveform on bus 13.

Figure 7:
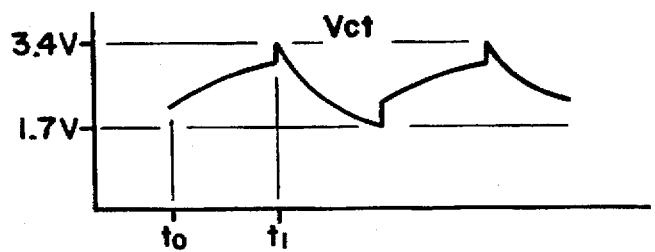
FIG. 7 is a slave operation mode showing of the power supply internal oscillator wave form (Vct)

FIG. 7 depicts the waveform on pin 4 of the UC3842 when it is in the slave operation mode.

SECOND PREFERRED EMBODIMENT OF THE INVENTION

Figure 8:
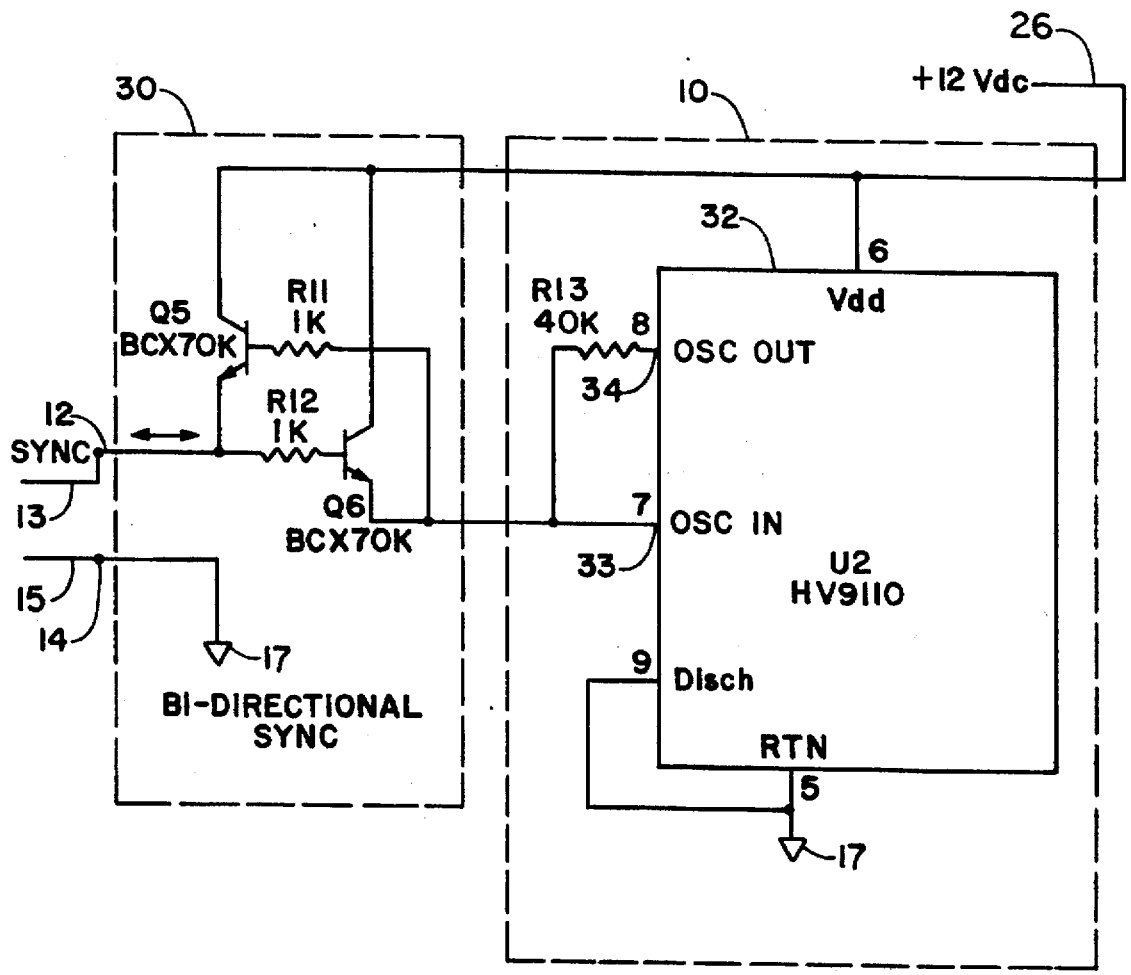
FIG. 8 is a schematic showing of a second embodiment of the invention with a power supply frequency controlled by a ring oscillator.

Referring now specifically to drawing FIG. 8, a second embodiment 30 of the controller of the invention for controlling the frequency of a Ring type Oscillator 3. As herein before noted this controller 30 like the controller 18 of the first preferred embodiment is incorporated within each of a plurality of PWM power supplies connected for the purpose of controlling the oscillator frequency of the entire power system.

As in the above description, the drawing FIG. 8 includes the components and their values. The ring oscillator is a part of a PWM IC type HV9110 or an equivalent there to.

Initially terminal 7 (connection 33) is low. Assuming the buffer within HV9110 has a threshold at half the supply voltage, the connection 33 ramps to one half of the supply voltage, then steps rapidly to the supply voltage at which time connection 33 ramps down to one half of the supply voltage then goes rapidly low. The cycle then begins again going high.

Figure 9:
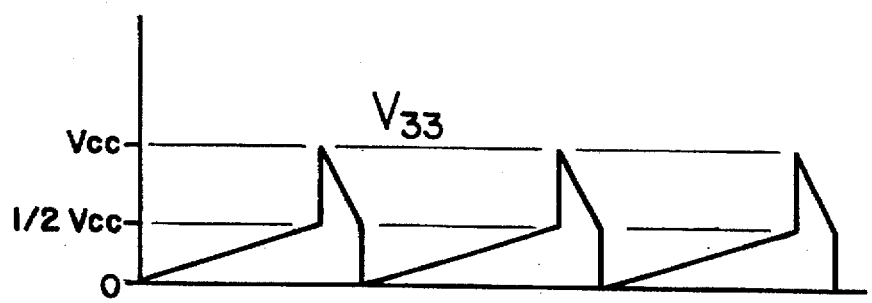
FIG. 9 is a showing of a typical ring oscillator wave form taken at pin 7 of the HV91120 IC.

As shown in FIG. 9 taken at location 33 of FIG. 8, the oscillator ramp voltage has a distinctive peak which can be used to trigger other oscillator circuits provided that a buffer is used to decouple the oscillator capacitor from the other circuits. Therefore, Q5 is the buffer for the positive going trigger pulse. On the other hand, Q6 acts as a buffer for incoming positive going pulses to decouple the clock bus from the oscillator.

As in the prior discussion directed to FIG. 2, if the signal on bus 13 is less than the operating frequency of the oscillator 32 the bus will be raised to the frequency of oscillator. If the frequency on bus 13 is greater than the operating frequency of oscillator 32, the frequency of oscillator 32 will be increased to frequency on bus 13.

Thus, there has been described a new system for controlling the frequency synchronization of a plurality of PWM power supplies. While there has been shown what is considered to be the preferred embodiments of the invention, it will be evident that many changes and modifications may be made therein and without departing from the essential spirit of the invention. It is intended, therefore, in the appended claims to cover any and all such changes and modifications which do not depart from the true spirit and scope of the invention.

What is claimed is:

1. A system for continual monitoring and adjusting of the frequency of a PWM power supply internal oscillator comprising:

a plurality of like PWM power supplies each having a control circuit and an associated oscillator;

a single bi-directional frequency signal connector for each of said plurality of PWM power supplies for both receiving and sending a frequency signal directly from each of said control circuits via a single signal bus;

a reference frequency signal, said reference frequency signal being present on said bi-directional frequency connectors; and each one of said control circuits determining the higher frequency as between its associated oscillator and said reference signal and adjusting the frequency of its associated oscillator to the frequency of said reference signal when the frequency of its associated oscillator is at a lower frequency than said reference signal and changing said reference signal to the frequency of its associated oscillator when said reference signal is at a lower frequency than its associated oscillator frequency.

2. The invention as defined in claim 1 wherein said oscillator is an RC type oscillator.

3. The invention as defined in claim 2 wherein said oscillator is capacity coupled to said control circuit.

4. The invention as defined in claim 1 wherein said oscillator is a ring type oscillator.

5. The invention as defined in claim 4 wherein said oscillator is DC coupled to a comparator.

6. The invention as defined in claim 1 wherein when the frequency of the one power supply oscillator of said plurality of like PWM power supplies having the highest frequency is applied to said bus causing the control circuit of each other power supply to change the frequency of its associated oscillator to said higher frequency.

7. A plurality of frequency control circuits, one of said circuits associated with one of a plurality of interconnected PWM power supplies each having an oscillator, said control circuit continually monitoring and adjusting the frequency of the oscillator of its associated power supply, each one of the control circuits synchronizes the frequency of its associated power supply oscillator with the oscillator frequency of one of said plurality of oscillators having the highest frequency, each of said control circuits comprising:

a monitoring circuit;

a single common bus;

a first single bi-directional connector port on said monitoring circuit connected directly to said common bus;

a second connector port on said monitoring circuit connected to its associated oscillator to control the frequency of that oscillator;

said monitoring circuit monitors the frequency on said common bus and the frequency of its associated oscillator and when said bus frequency is higher than the frequency of its associated oscillator said monitoring circuit causes its associated oscillator frequency to increase to a level equal to said bus frequency and if said bus frequency is lower than the frequency of said associated oscillator said monitor control causes an increase in the frequency of said bus to its associated oscillator's operating frequency thereby all of said powers supplies connected to said bus operate at substantially the same frequency at any given time which is the highest frequency of any one of said oscillators.

8. The control circuit as defined in claim 7 wherein said oscillator is an RC type oscillator.

9. The control circuit as defined in claim 7 wherein said oscillator is a Ring type oscillator.

10. The control circuit as defined in claim 7 wherein said monitoring circuit is directly connected to its associated oscillator to control the frequency of that oscillator.

11. The control circuit as defined in claim 7 wherein said monitoring circuit is capacitively connected to its associated oscillator to control the frequency of that oscillator.

* * * * *